(12) United States Patent
Kuroda et al.

(10) Patent No.: US 6,190,284 B1
(45) Date of Patent: *Feb. 20, 2001

(54) ENGINE STOP CONTROL SYSTEM FOR VEHICLE

(75) Inventors: Shigetaka Kuroda; Hideyuki Takahashi; Kenji Nakano; Teruo Wakashiro; Youichi Iwata, all of Wako (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/271,241

(22) Filed: Mar. 17, 1999

(30) Foreign Application Priority Data

Mar. 17, 1998 (JP) .................................................. 10-067162
Mar. 17, 1998 (JP) .................................................. 10-067163
Mar. 17, 1998 (JP) .................................................. 10-067169
Mar. 17, 1998 (JP) .................................................. 10-067170

(51) Int. Cl.$^7$ ............................ B60K 41/20; F02N 17/08
(52) U.S. Cl. ........................ 477/107; 477/112; 123/179.4
(58) Field of Search ..................................... 477/107, 109, 477/110, 112, 73, 185, 186; 701/101, 104, 112; 123/179.3, 179.4

(56) References Cited

U.S. PATENT DOCUMENTS 3,731,108 * 5/1973 Kobara et al. ...................... 290/38 R
4,006,723 * 2/1977 Schmidli ............................. 123/179.2
4,078,631 * 3/1978 Kadota et al. ........................... 180/179
4,286,683 * 9/1981 Zeigner et al. ....................... 180/54.1
4,493,303 * 1/1985 Thompson et al. .................. 123/357
4,500,794 * 2/1985 Hamano et al. ..................... 290/38 C
4,510,396 * 4/1985 Uchida et al. ....................... 290/30 R
5,146,891 * 9/1992 Nakazawa et al. .................. 123/325
5,529,548 * 6/1996 Mack .................................... 477/84
5,529,549 * 6/1996 Moyer ................................. 477/189
5,713,334 * 2/1998 Anamoto .............................. 123/491
5,951,440 * 9/1999 Reichlinger ......................... 477/167

FOREIGN PATENT DOCUMENTS 33 20 401   12/1983   (DE) .
44 21 512    6/1995   (DE) .
195 32 135   3/1997   (DE) .
0 847 494    6/1998   (EP) .

* cited by examiner

Primary Examiner—Charles A. Marmor
Assistant Examiner—Ha Ho
(74) Attorney, Agent, or Firm—Armstrong, Westerman, Hattori, McLeland & Naughton

(57) ABSTRACT

When the shift position is an N position or a P position during deceleration of a vehicle, or when a brake pedal is depressed even if the shift position is a D position or an R position, an engine E is stopped to prohibit an unnecessary idling operation by prohibiting the restarting of the supplying of fuel subsequent to the fuel cut by a command from an electronic control unit. If the supplying of fuel is restarted when the engine is in stoppage, a starter motor is driven automatically to start the engine. Thus, in a vehicle including an automatic transmission, the time of stoppage of the engine can be prolonged as much as possible in a range in which the operability of the vehicle is injured, thereby providing a reduction in amount of fuel consumed.

9 Claims, 15 Drawing Sheets

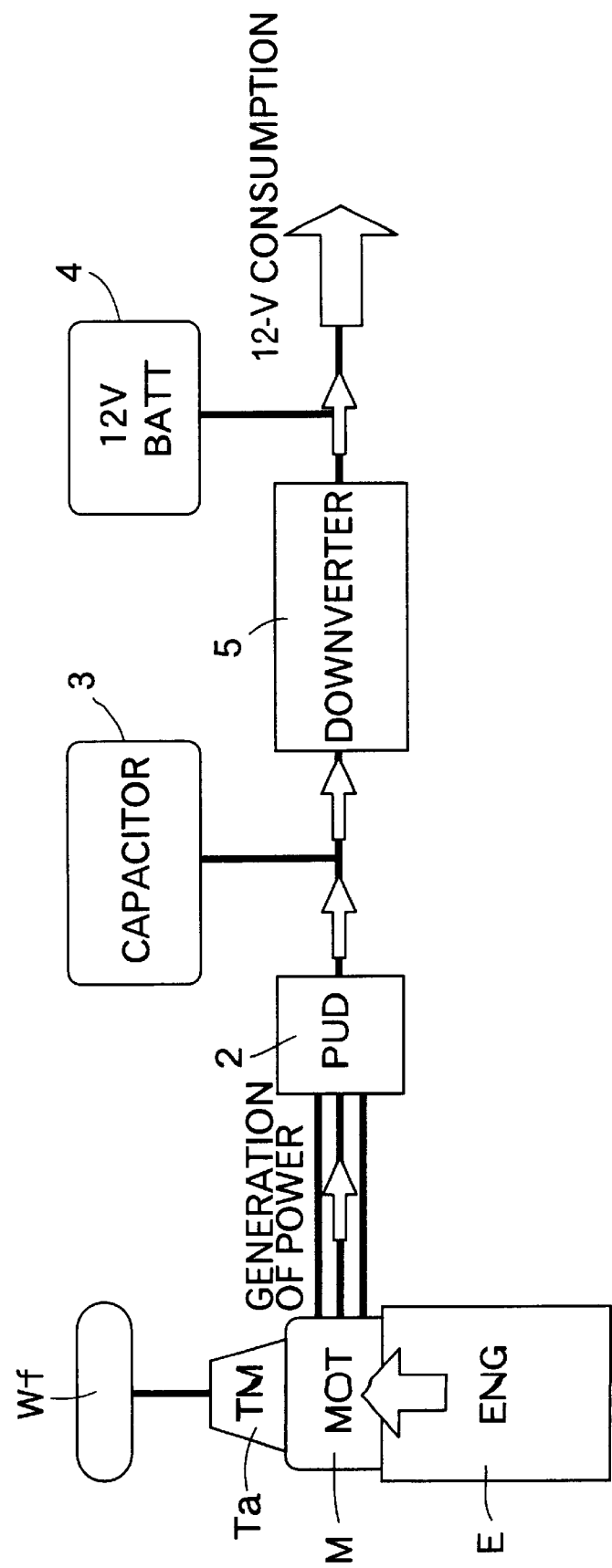

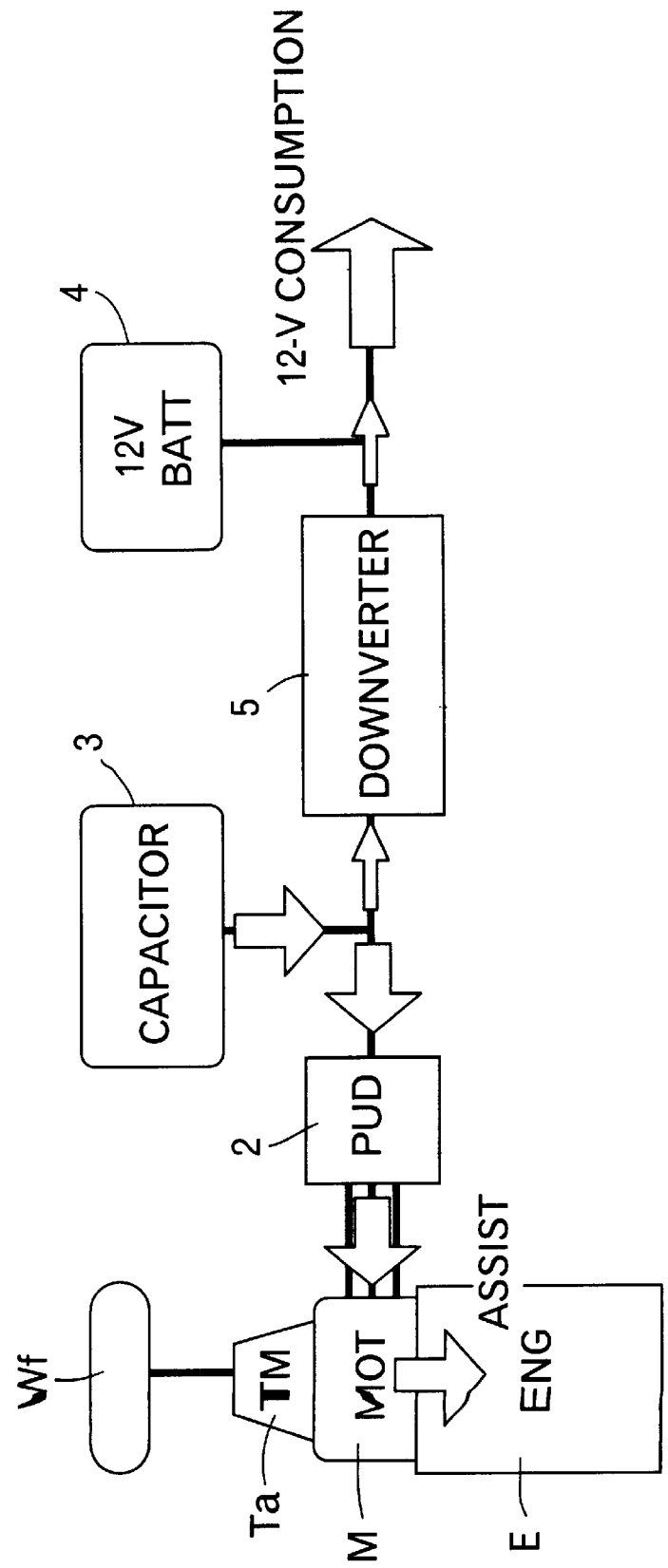

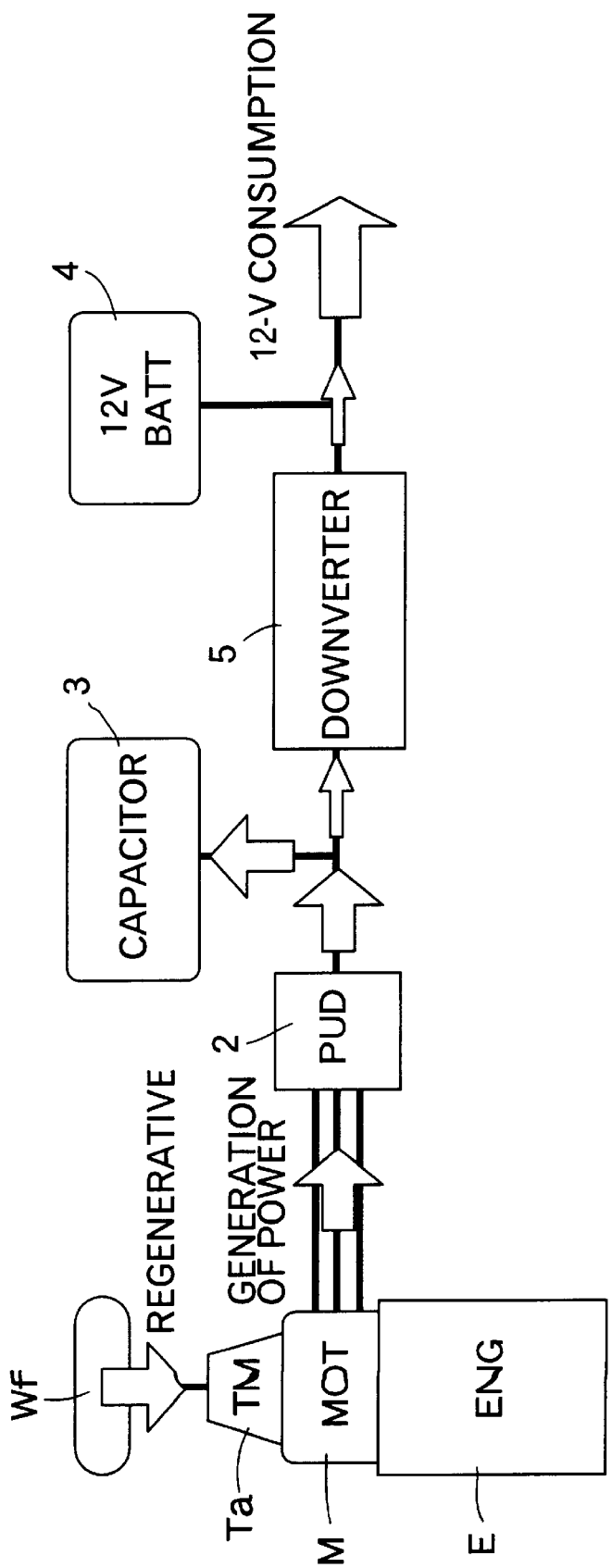

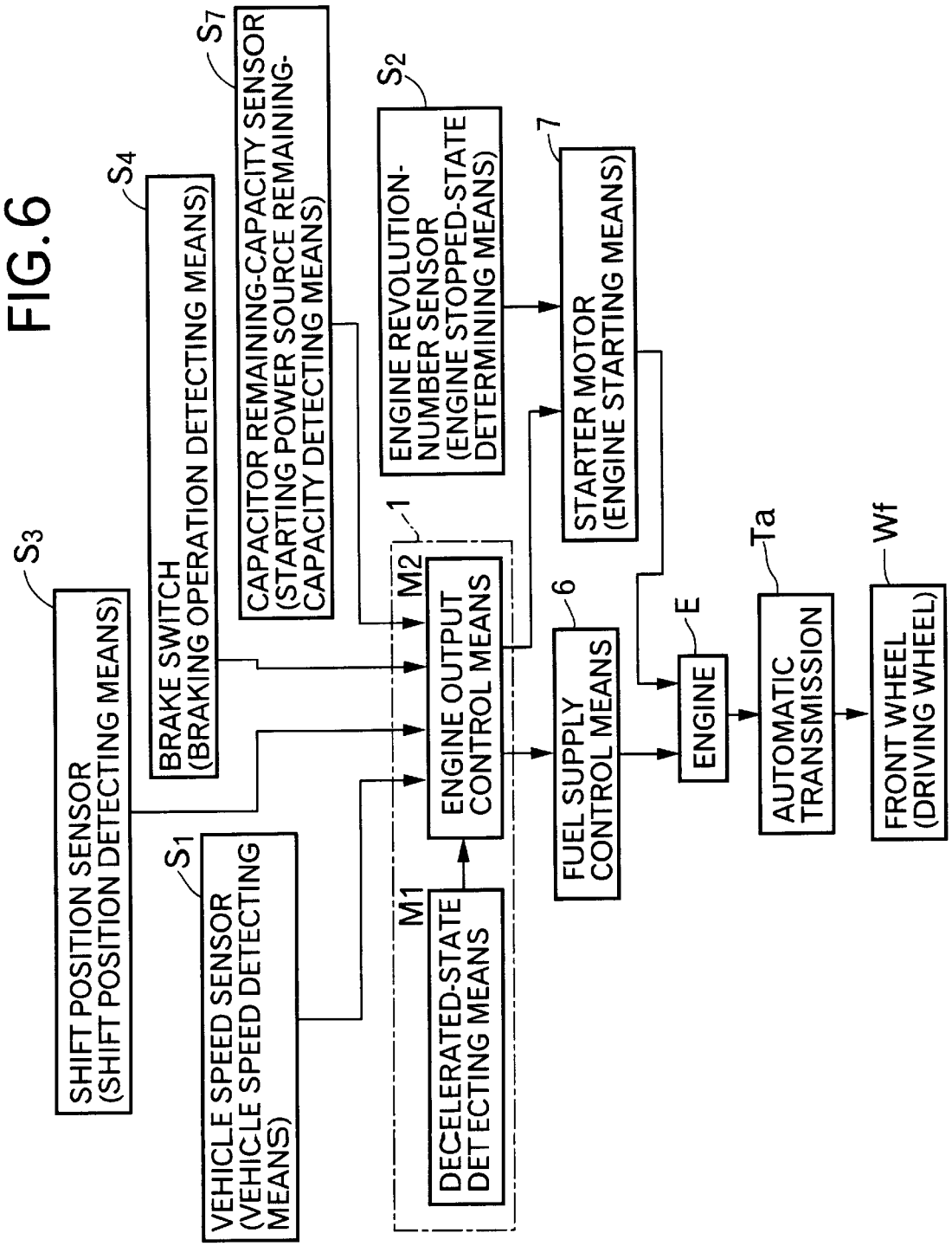

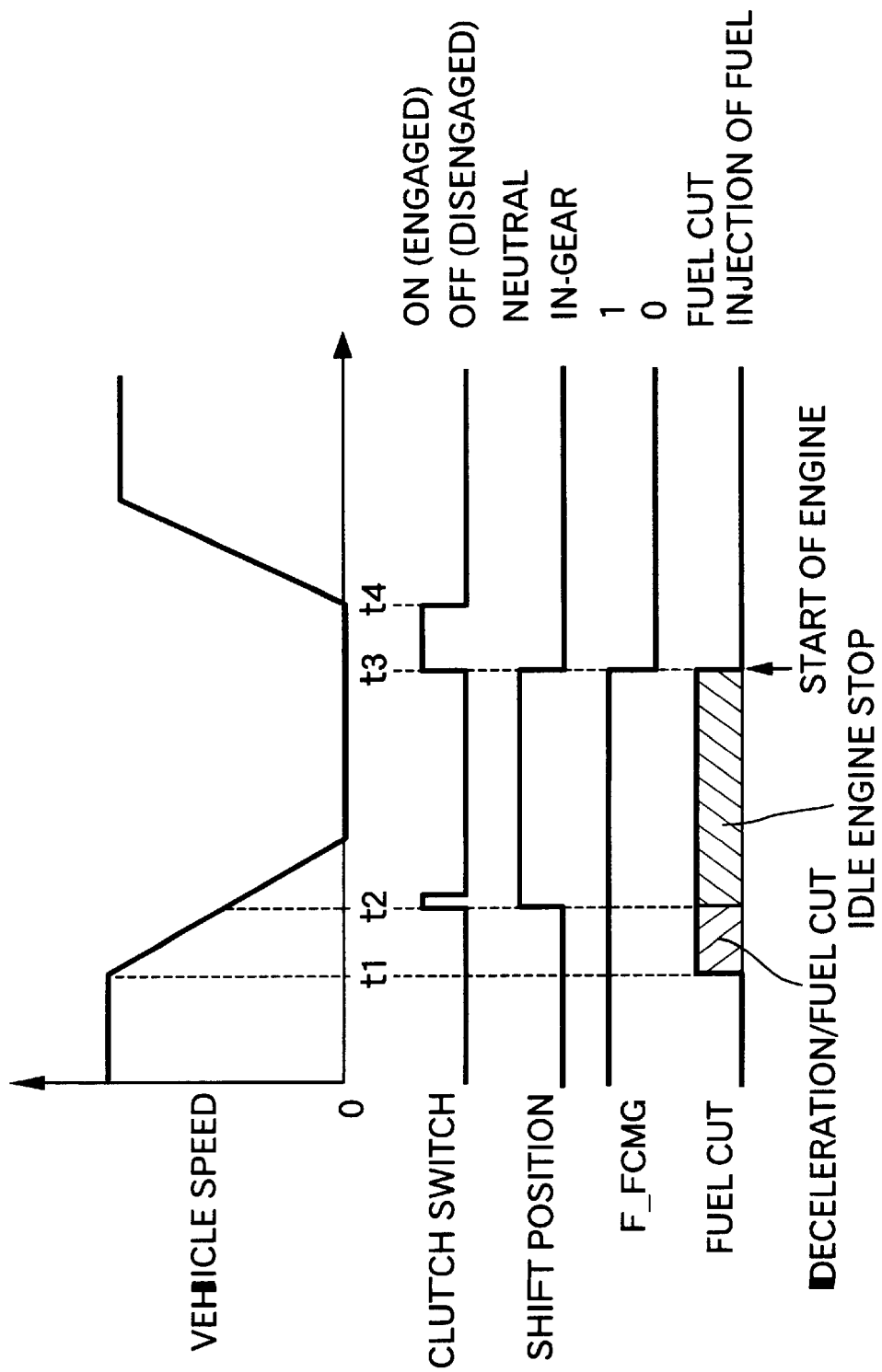

ENGINE STOP CONTROL SYSTEM FOR VEHICLE

BACKGROUND OF THE INVENTION

1. Field of the Invention

The present invention relates to an engine stop control system for a vehicle in which when a predetermined condition is established during an idling operation, an engine is stopped to reduce the amount of fuel consumed.

2. Description of the Related Art

A conventional vehicle using an engine as a traveling drive source suffers from a problem in that the engine once started is not stopped unless a driver turns an ignition switch off and for this reason, the wasteful idling operation of the engine is continued for a signal-waiting period, for example, thereby consuming fuel wastefully. To avoid this, the driver may turn the ignition switch off to stop the engine every time the vehicle is stopped. In this case, however, the driver must repeatedly carry out the starting and the stopping of the engine and hence, such operation is extremely troublesome.

Therefore, in a commercially available vehicle including a manual transmission mounted therein, an engine is stopped automatically after a lapse of 1 to 2 seconds from the stoppage of the vehicle. If the depression of a clutch pedal from this state is detected, the engine is restarted automatically, thereby providing a reduction in the amount of fuel consumed.

In the conventional vehicle, however, the engine is stopped only for a period from a time point after the lapse of 1 to 2 seconds from the stopping of the vehicle to a time point of the depression of the clutch pedal. Therefore, to further reduce the amount of fuel consumed, it is desired that the time of stoppage of the engine is prolonged as much as possible in a range in which the operability of the vehicle is not diminished.

If the engine is turned off upon stopping of the vehicle and then restarted upon starting of the vehicle, as described above, the following problem is encountered: When the stopping and starting of the vehicle are repeatedly carried out at short time intervals on a road in which there is a traffic jam, the stopping and restarting of the engine are carried out frequently and hence, the driver may become irritated.

SUMMARY OF THE INVENTION

Accordingly, it is a first object of the present invention to ensure that in a vehicle including an automatic transmission, the time of stoppage of the engine is prolonged as much as possible in the range in which the operability of the vehicle is not diminished, thereby providing a reduction in the amount of fuel consumed.

It is a second object of the present invention to ensure that in a vehicle including a manual transmission, the time of stoppage of the engine is prolonged as much as possible to provide a reduction in amount of fuel consumed, while the stopping and restarting of the engine are prevented from being carried out frequently in a traffic jam.

To achieve the above first object, according to a first aspect and feature of the present invention, there is provided an engine stop control system for a vehicle, comprising an engine, an automatic transmission for transmitting a driving force of the engine to driven wheels, a shift position detecting means for detecting a shift position of the automatic transmission, a braking operation detecting means for detecting a braking operation provided by a driver, a fuel supply control means for controlling the supply of fuel to the engine, a decelerated-state detecting means for detecting a decelerated state of the vehicle, and an engine output control means including a means for cutting off the supplying of fuel to the engine by the fuel supply control means, when the decelerated state of the vehicle is detected by the decelerated-state detecting means, and for restarting the supplying of fuel to start the engine, when the number of revolutions of the engine is equal to or less than a threshold value, the engine output control means operating, after cutting-off of the supply of fuel by the fuel supply control means during deceleration of the vehicle, to restart the supplying of fuel, if the number of revolutions of the engine becomes equal to or less than the threshold value, when the shift position detected by the shift position detecting means is a travel position and the braking operation is not detected by the braking operation detecting means after and stop the engine without restarting of the supply of fuel even if the number of revolutions of the engine becomes equal to or less than the threshold value, when the shift position detected by the shift position detecting means is a non-travel position, or when the shift position detected by the shift position detecting means is a travel position and the braking operation is detected by the braking operation detecting means.

With the above arrangement, when the shift position is the travel position and the braking operation is not detected, the driving of the engine is maintained. Therefore, the undesirable stopping of the engine can be avoided, and the necessary idling operation of the engine can be carried out. When the shift position is the non-travel position, or when the shift position is the travel position and the braking operation is detected, the engine is stopped. Therefore, the engine can be stopped for a maximum amount of time without carrying-out of the unnecessary idling operation, thereby reducing the amount of fuel consumed.

The non-travel position used herein corresponds to a neutral position and a parking position in one embodiment, and the travel position corresponds to a forward travel position and a backward travel position in the embodiment.

To achieve the above second object, according to a second aspect and feature of the present invention, there is provided an engine stop control system for a vehicle, comprising an engine, a manual transmission for transmitting a driving force of the engine to driven wheels, a shift position detecting means for detecting a shift position of the manual transmission, a clutch operation detecting means for detecting the engaging/disengaging operation of a clutch pedal to carry out the cut-off and coupling of a driving force between the engine and the manual transmission, a vehicle speed detecting means for detecting a vehicle speed, a throttle opening degree detecting means for detecting a throttle opening degree, a decelerated-state detecting means for detecting a decelerated state of the vehicle, and an engine output control means including a means for cutting off the supplying of fuel to the engine by the fuel supply control means, when a decelerated state of the vehicle is detected by a decelerated-state detecting means, and for restarting the supplying of fuel to start the engine, when the number of revolutions of the engine becomes equal to or less than a threshold value, the engine output control means continuing the cutting-off of the supplying of fuel, if the throttle opening degree detected by the throttle opening degree detecting means is a fully-closed throttle opening degree, when the vehicle speed detected by the vehicle speed detecting means reaches a predetermined vehicle speed; and when the clutch-disengaging operation is detected by the clutch operation detecting means, and the shift position detected by the shift position detecting means is a non-travel position, after cutting-off of the supplying of fuel by the fuel supply control means during deceleration of the vehicle, and restarting the supplying of fuel, if the throttle opening degree detected by the throttle opening degree detecting means is not the fully-closed throttle opening degree.

With the above arrangement, after the vehicle speed detected by the vehicle speed detecting means reaches the predetermined vehicle speed after starting of the vehicle, the engine is stopped if the throttle opening degree is the fully-closed opening degree, when the clutch-disengaging operation is detected and the shift position is the non-travel position. Therefore, the engine can be stopped to the maximum without carrying-out of the unnecessary idling operation to reduce the amount of fuel consumed. Moreover, if the throttle opening degree is not the fully-closed opening degree, the engine is not stopped. Therefore, it is possible to prevent the engine from being stopped, for example, when an accelerator pedal is depressed to carry out a downshifting during traveling of the vehicle, and an increase in the number of revolutions of the engine corresponding to the throttle opening degree can be achieved to carry out the downshifting smoothly. In addition, the stopping of the engine is not carried out until the vehicle speed reaches the predetermined vehicle speed after starting of the vehicle. Therefore, it is possible to avoid repeated stopping and starting of the engine in a traffic jam or during garaging of the vehicle by creeping, thereby preventing the driver from feeling irritation.

The non-travel position used herein corresponds to a neutral position and a parking position in one embodiment, and the travel position corresponds to a forward travel position and a backward travel position in the embodiment. The above and other objects, features and advantages of the invention will become apparent from the following description of the preferred embodiments taken in conjunction with the accompanying drawings.

BRIEF DESCRIPTION OF THE DRAWINGS

FIGS. 1 to 10 show a first embodiment of the present invention, wherein:

FIG. 1 is a view of the entire arrangement of a hybrid vehicle including an automatic transmission;

FIG. 2 is a diagram for explaining a cruising/idling mode;

FIG. 3 is a diagram for explaining an accelerating mode;

FIG. 4 is a diagram for explaining a decelerating mode;

FIG. 6 is a view of the idle engine stop control system of the first embodiment;

FIG. 7 is a first portion of a flow chart of a main routine;

FIG. 8 is a second portion of the flow chart of the main routine;

FIG. 9 is a flow chart of a sub-routine of Step S17 in the main routine;

FIG. 10 is a time chart showing one example of an idle engine stop control operation;

FIGS. 11 to 15 show a second embodiment of the present invention, wherein FIG. 11 is a view of the entire arrangement of a hybrid vehicle including a manual transmission;

FIG. 12 is a view of the idle engine stop control system of the second embodiment;

FIG. 13 is a first portion of a flow chart of a main routine;

FIG. 14 is a second portion of the flow chart of the main routine; and

FIG. 15 is a time chart illustrating one example of an idle engine stop control operation.

DETAILED DESCRIPTION OF THE PREFERRED EMBODIMENTS

A first embodiment of the present invention will now be described with reference to FIGS. 1 to 10.

Figure 1:
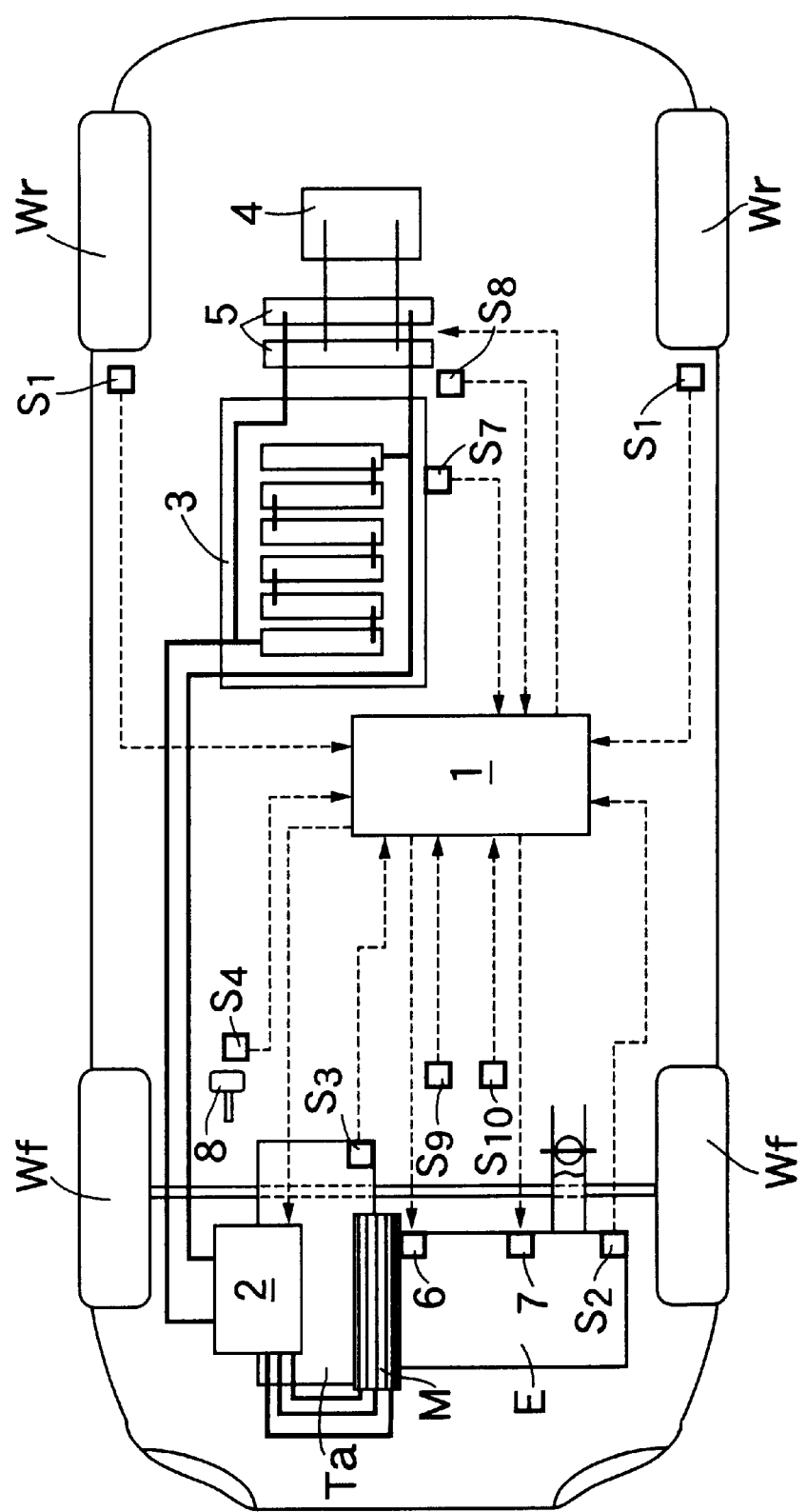

As shown in FIG. 1, a hybrid vehicle includes an engine E and a motor M. The driving force of the engine E and/or the driving force of the motor M is transmitted through an automatic transmission Ta to front wheels Wf, Wf, which are driven wheels. When the driving force is transmitted from the front wheels Wf, Wf, to the motor M during deceleration of the hybrid vehicle, the motor M functions as a generator to produce a so-called regenerative braking force and to recover a kinetic energy of a vehicle body as electric energy.

The control of the driving and regenerative operations of the motor M is carried out by a power drive unit 2 connected to an electronic control unit 1 comprising a microcomputer. A capacitor 3 as an accumulating means comprising an electric double-layer condenser is connected to the power drive unit 2. The capacitor 3 comprises six modules connected in series, with twelve cells connected in series and having a maximum voltage of 2.5 V connected in series, and having a maximum voltage of 180 V. An auxiliary battery 4 of 12 V for driving various auxiliaries is mounted in the hybrid vehicle and connected through a downverter 5 to the capacitor 3. The downverter 5 controlled by the electronic control unit 1 drops the voltage of the capacitor 3 to 12 V to charge the auxiliary battery 4.

The maximum voltage of the capacitor 3 is 180 V, but the maximum voltage actually used in order to prevent the deterioration due to overcharging is limited to 170 V, and the minimum voltage actually used in order to ensure the operation of the downverter 5 is limited to 80 V.

The electronic control unit 1 controls the operation of a fuel supply control means 6 for controlling the amount of fuel supplied to the engine E and the operation of a starter motor 7 driven by an electric power accumulated in the capacitor 3, in addition to the power drive unit 2 and the downverter 5. For this purpose, the following signals are inputted to the electronic control unit 1: a signal from a vehicle speed sensor $S_1$ for detecting a vehicle speed V based on the rotational speeds of rear wheels Wr, Wr which are follower wheels; a signal from an engine revolution-number sensor $S_2$ for detecting a number Ne of revolutions of the engine; a signal from a shift position sensor $S_3$ for detecting a shift position (such as a neutral position, a parking position, a forward travel position and a backward travel position) of the automatic transmission Ta; a signal from a brake switch $S_4$ for detecting the operation of a brake pedal 8; a signal from a capacitor remaining capacity sensor $S_7$ for detecting a remaining capacity of the capacitor 3; a signal from a 12-Volt consumed-power sensor $S_8$ for detecting a consumed power taken out of auxiliary battery 4; a signal from an ignition switch $S_9$; and a signal from a starter switch $S_{10}$.

The electronic control unit 1 includes a decelerated-state detecting means M1 and an engine output control means M2 (see FIG. 6). The decelerated-state detecting means M1 detects that the vehicle is in a decelerated/fuel-cut state, based on a variation in vehicle speed V detected by the vehicle speed sensor $S_1$, the closing motion of a throttle valve detected by a throttle opening degree sensor, a negative pressure of intake air detected by intake-air negative pressure sensor and the like. The engine output control means M2 is adapted to cut off the amount of fuel supplied to the engine E by the fuel supply control means 6 to stop the engine E.

An outline of the control of the engine E and the motor M in each of travel modes will be described below.

(1) Cruising/idling Mode

As shown in FIG. 2, during cruising of the vehicle or during idling operation of the engine E, the motor M functions as a generator driven by the engine E. A consumed power taken out of the auxiliary battery 4 of 12 V is estimated from an electric power upstream of the downverter 5, and an electric power enough to be able to replenish the 12-volt consumed power is generated by the motor M and supplied to the auxiliary battery 4.

(2) Accelerating Mode

As shown in FIG. 3, during accelerating travel of the vehicle, the motor M is driven by an electric power taken out of the capacitor 3 to assist in the output of the engine E and to replenish the 12-volt consumed power taken out of the auxiliary battery 4. The assisting amount generated by the motor M is determined by map-searching, based on the remaining capacity of the capacitor 3, the shift position, the number of revolutions of the engine, the throttle opening degree, the negative pressure of intake air and the like.

(3) Decelerating Mode

As shown in FIG. 4, during decelerating travel of the vehicle, the regenerative braking operation is carried out by the driving force reversely transmitted from the front wheels Wf, Wf which are driving wheels to the motor M. The capacitor 3 is charged by the regenerative power generated by the motor M, and the 12-volt consumed power taken out of the auxiliary battery 4 is replenished. The regenerative braking quantity generated by the motor M is determined by map-searching based on the shift position, the number of revolutions of the engine and the negative pressure of intake air.

Figure 5A:
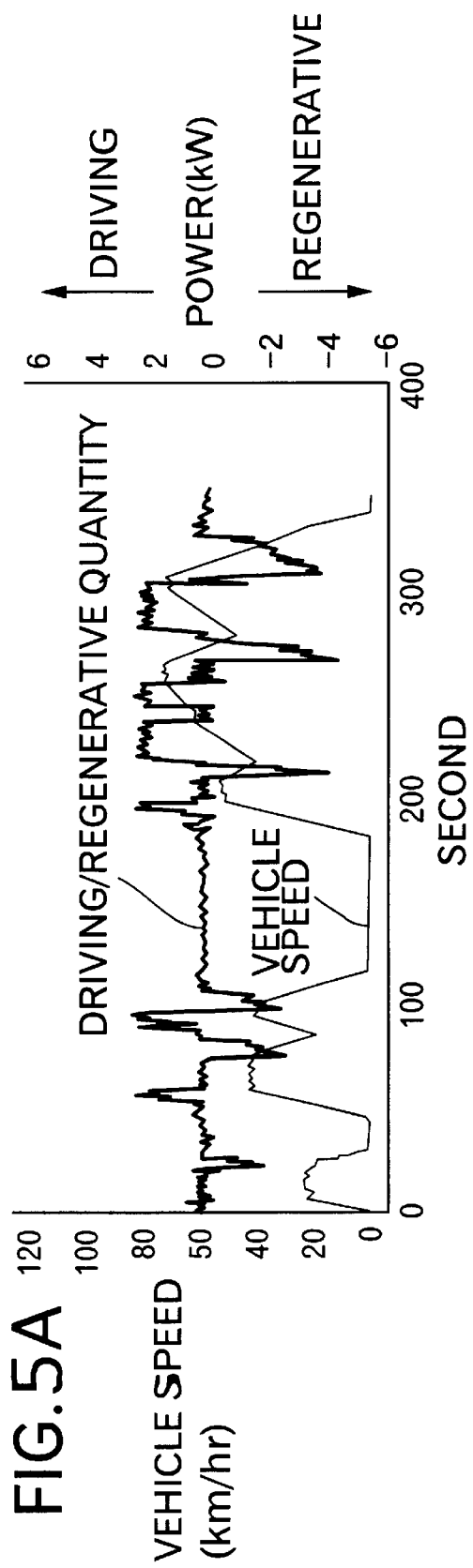
FIG. 5A is a diagram showing the vehicle speed V and driving/regenerative quantity of a motor M, when the vehicle is traveling in a 10•15 mode.

FIG. 5A shows the vehicle speed V (see a thin line) and the driving/regenerative quantity (see thick line), when the vehicle travels in a 10•14 mode. During accelerating travel of the vehicle, the motor M generates a driving force to alleviate the load of the engine E, whereby the amount of fuel consumed can be reduced. During decelerating travel of the vehicle, the motor M generates a regenerative braking force, and the kinetic energy lost intrinsically by the mechanical braking operation can be effectively recovered as electric energy.

Figure 5B:
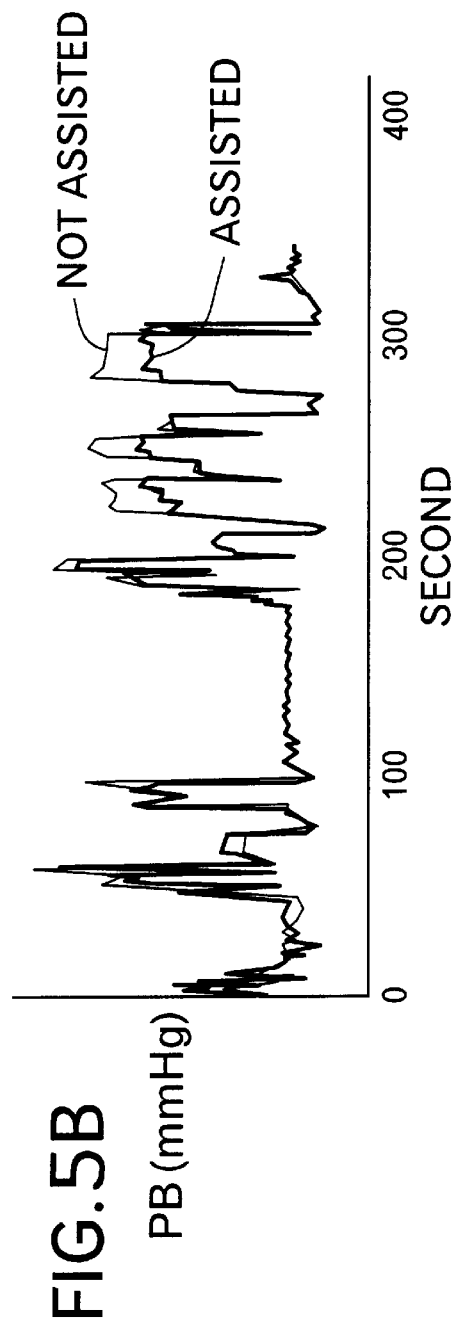
FIG. 5B is a diagram showing the negative pressure of intake air corresponding to the load of the engine E.

FIG. 5B shows the negative pressure of intake air corresponding to the load of the engine E, wherein a thick line corresponds to a case where the assisting by the motor M was carried out, and a thin line corresponds to a case where the assisting by the motor M was not carried out. Generally, the thick line lies below the thin line, and it can be seen that the assisting force of the motor contributes to the alleviation of the load of the engine E.

The typical vehicle is designed so that the fuel is cut during deceleration of the vehicle, and when the number of revolutions of the engine is decreased to an idling level, the fuel cut is discontinued, so that the engine E is not stopped, and the supplying of the fuel in an amount enough to maintain the idling operation is restarted. In this embodiment, however, when a predetermined operating condition is established, the engine E is stopped without restoring of the fuel supply subsequent to the fuel cut. When the predetermined operating condition is not established, the restoring of the fuel supply is carried out to restart the engine, whereby the engine is stopped a maximum amount of time during idling operation to provide a further reduction in amount of fuel consumed.

The arrangement of the idle engine stop control system according to this embodiment will be described below with reference to FIG. 6.

The fuel supply control means 6 controls the supplying of the fuel to the engine E driving the front wheels Wf, Wf through the automatic transmission Ta on the basis of a command from the electric control unit 1. The electric control unit 1 determines whether the idling operation of the engine is permitted, or prohibited for stopping of the engine, based on the vehicle speed inputted from the vehicle speed sensor $S_1$, the shift position inputted from the shift position sensor $S_3$, the braked state inputted from the brake switch $S_4$ and the remaining capacity of the capacitor 3 inputted from the capacitor remaining capacity sensor $S_7$. When the idling operation is permitted, the fuel supply control means 6 permits the restarting of the fuel supply subsequent to the fuel cut to enable the idling operation. When the idling operation is prohibited, the fuel supply control means 6 prohibits the restarting of the fuel supply subsequent to the fuel cut to stop the engine E.

When the idling operation is permitted when it is detected that the engine E is in stopped based on the output from the engine revolution-number sensor $S_2$, the starter motor 7 is driven, and the engine E is automatically started. However, immediately after the ignition switch $S_9$ is turned on, the starter motor 7 is driven only when the starter switch $S_{10}$ is turned on. Therefore, when a driver does not intend to move the vehicle, the engine E is not needlessly started.

Figure 7:
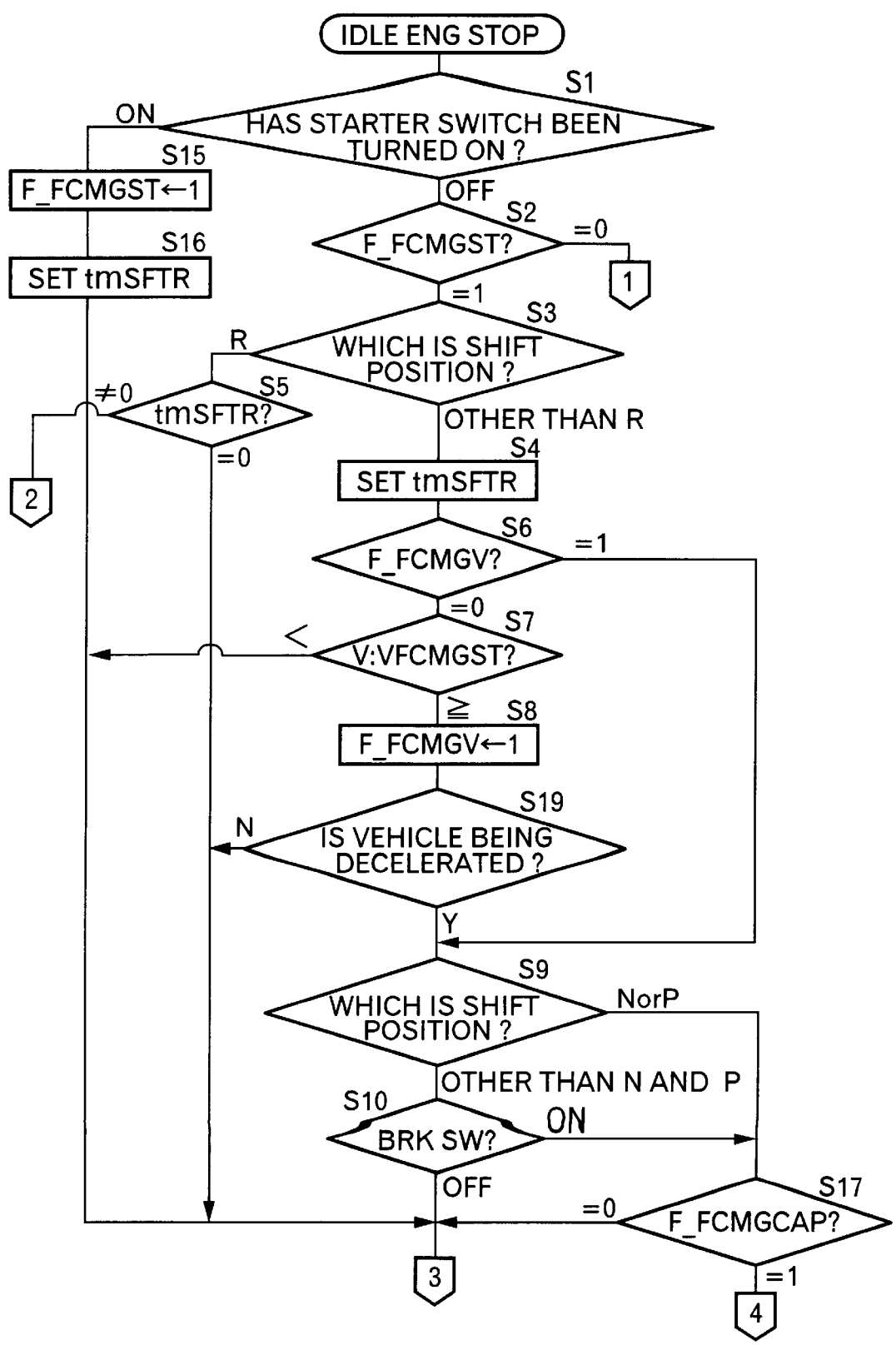
Figure 8:
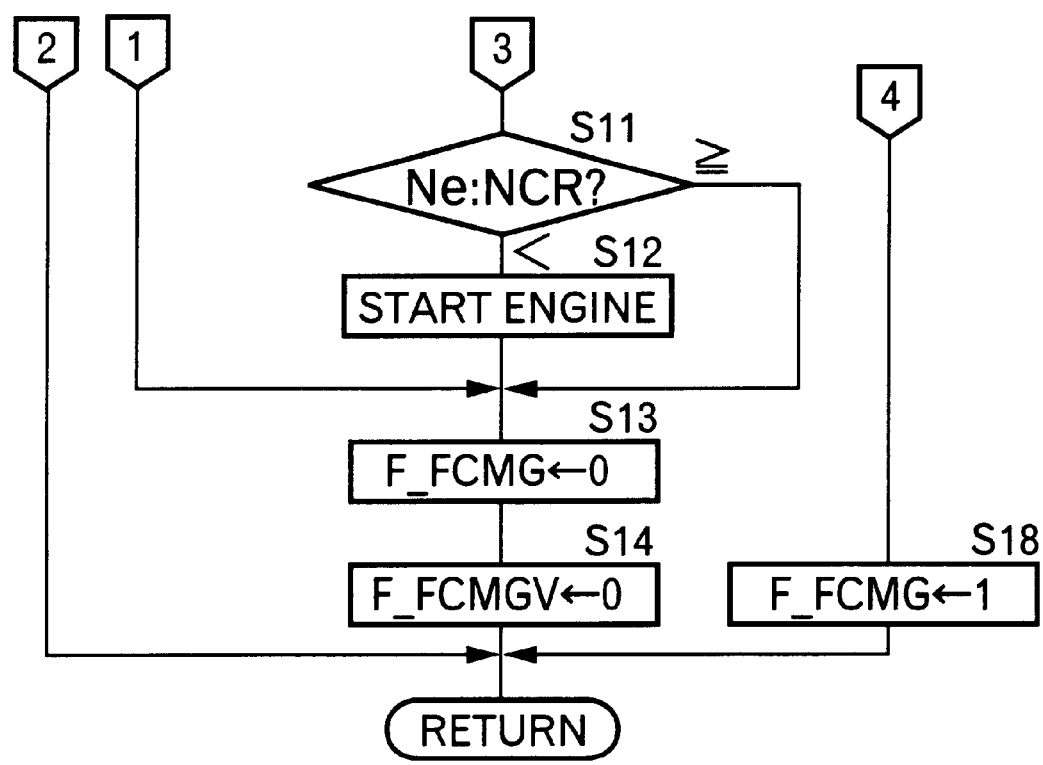

The particular content of the idle engine stop control of the vehicle shown in FIG. 1 will be described below with reference to flow charts in FIGS. 7 and 8.

First, when the starter switch $S_{10}$ is in a turned-off state at Step S1, i.e., when the engine starting operation is not carried out by the driver, the state of a starter switch OFF→ON determining flag F__FCMGST is determined at Step S2. The initial value of the starter switch OFF→ON determining flag F__FCMGST at the time when the ignition switch $S_9$ is turned on is "0" when the engine starting operation is carried out by the driver at Step S1 to turn on the starter switch $S_{10}$, the starter switch OFF→ON determining flag F__FCMGST is set at "1" at Step S15 and maintained at "1", until the ignition switch is turned off.

Therefore, the answer at Step S2 is "0" for a period from a time point when the driver turns on the ignition switch $S_9$ to a time point when the driver turns on the starter switch $S_{10}$, and the processing is advanced to Step S13 and hence, the starting of the engine at Step S12, which will be described hereinafter cannot be carried out. Namely, in this vehicle, the stopping of the engine during the idling operation and the subsequent starting of the engine are carried out, irrespective of the operation of starter switch $S_{10}$ by the driver, as described hereinafter. However, unless the driver intends to turn on the starter switch $S_{10}$ to move the vehicle, the engine E cannot be started automatically. Thus, the needless starting of the engine can be avoided to reduce the amount of fuel consumed.

If the driver turns on the starter switch $S_{10}$ at Step S1, the starter switch OFF→ON determining flag F__FCMGST is set at "1" at Step S15, and a backward travel position determining delay timer tmSFTR which will be described hereinafter is set at Step S16, shifting to Step S11. At Step S11, the number Ne of revolutions of the engine detected by the engine revolution-number sensor $S_2$ is compared with an engine stall determining revolution-number NCR. If Ne<NCR to indicate that the engine E is in a stopped state, the starter motor 7 is operated automatically to start the engine E. As a result, when the engine E is started to ensure that Ne≧NCR, the starting of the engine at the Step S12 is passed, progressing to Step S13.

Subsequently, an idle engine stop control performing flag F_FCMG is set at "0" at Step S13. The idle engine stop control performing flag F_FCMG serves to determine whether the engine E is to be stopped during idling operation thereof. In a state in which the idle engine stop control performing flag F_FCMG has been set at "0", the restarting of the fuel supply subsequent to the fuel cut is carried out, causing the fuel to be supplied in an amount adequate enough to maintain the idling operation by the command from the engine output control means M2, whereby the engine E is maintained in the idling operation. In a state in which the idle engine stop control performing flag F_FCMG has been set at "1", the restarting of the fuel supply subsequent to the fuel cut is prohibited (or the fuel is supplied in only an amount insufficient to maintain the idling operating) by the command from the engine output control means M2, causing the engine E to be stopped without being idled. The idle engine stop control performing flag F_FCMG is set at "1" at Step S18, when a predetermined condition which will be described has been established. At subsequent Step S14, a vehicle speed determining flag F_FCMGV is set at "0".

Now, if the driver turns off the starter switch $S_{10}$ after turning-on of the starter switch $S_{10}$ to start the engine E, the starter switch OFF→ON determining flag F_FCMGST has been already set at "1" at Step S2 and hence, the processing is advanced to Step S3. If the shift position detected by the shift position sensor $S_3$ is not the backward travel position at Step S3, the backward travel position determining delay timer tmSFTR is set at Step S4. If the shift position is the backward travel position at Step S3, it is determined at Step S5 whether the counting time of the backward travel position determining delay timer tmSFTR is up, after elapse of a predetermined time (e.g., 0.5 seconds). As a result, if the backward travel position determining delay timer tmSFTR is not up at Step S5, the processing is returned to Step S1. If the backward travel position determining delay timer tmSFTR is up at Step S5, the processing is advanced to Step S11.

What this means is as follows: In the vehicle according to this embodiment, if the driver releases his foot from the brake pedal 8, when the idle engine stop control is being carried out by depressing of the brake pedal 8, the idle engine stop control is discontinued, causing the engine E to be restarted automatically. Suppose that the vehicle equipped with the automatic transmission Ta is allowed to creep backward by repeating of the turning-on/off operation of the brake pedal 8, for example, to garage the vehicle. In this case, if the engine is repeatedly stopped and restarted every time the brake pedal 8 is tuned on and off, the following problem is encountered: it is difficult to ensure smooth backward creeping. When the brake pedal 8 is depressed to change the forward movement to the backward movement for garaging of the vehicle or the like, the engine E is stopped by the idle engine stop control. Supposing that even if the shift position is changed to the backward travel position, the engine E is not restarted unless the driver releases his foot from the brake pedal 8, the following problem is encountered: backward creeping is not carried out smoothly.

In this embodiment, however, when the shift position is the backward travel position at Step S3, the processing is advanced to Steps S11 and S12. At this time, if the engine E is in stoppage, the engine is restarted immediately, and at Step S13, the idle engine stop control performing flag F_FCMG is set at "0" to discontinue the idle engine stop control. Therefore, the engine E can be maintained in the idling operation to solve the above problems. Moreover, if the time period for which the shift position is the backward travel position is not equal to or greater than 0.5 seconds counted by the backward travel position determining delay timer tmSFTR, the above-described control is not carried out. Therefore, it is possible to avoid that the unnecessary control is carried out when the backward travel position has been established instantaneously in the course of operation of a select lever.

Subsequently, the state of the vehicle speed determining flag F_FCMGV is determined at Step S6. The vehicle speed determining flag F_FCMGV has been set at "0" immediately after stating of the vehicle, and when the vehicle speed V detected by the vehicle speed sensor $S_1$ is equal to or predetermined vehicle speed (e.g., 15 km/hr) at next Step S7, the vehicle speed determining flag F_FCMGV is set at "1" at Step S8. Therefore, unless the vehicle speed V is equal to or higher than 15 km/hr at Step S7, the processing is necessarily advanced to Step S13, at which the idle engine stop control performing flag F_FCMG is set to "0", whereby the idle engine stop control operation is discontinued and hence, cannot be carried out.

What this means is as follows: If the carrying-out of the idle engine stop control operation is permitted when the vehicle is allowed to creep at an extremely low speed for garaging of the vehicle or in a traffic jam, while turning on and off the brake pedal 8, the stopping and restarting of the engine E are repeatedly carried out with the turning-on/off of the brake pedal 8, resulting in a possibility that smooth traveling of the vehicle cannot be achieved. However, the above problem can be solved by prohibiting the carrying-out of the idle engine stop control operation when the vehicle speed V is lower than 15 km/hr.

If it is detected at subsequent Step S19 by the decelerated-state detecting means M1 that the vehicle is in a decelerated state, the processing is shifted to Step S9. If the shift position is the neutral position or the parking position at Step S9, or if the brake pedal 8 has been depressed causing the brake switch $S_4$ to be turned on at Step S10, even if the shift position is the forward travel position at Step S9, the processing is advanced to Step S17, at which the state of a capacitor remaining-capacity determining flag F_FCMGCAP is determined.

The capacitor remaining-capacity determining flag F_FCMGCAP is intended to determine whether the remaining capacity of the electric power accumulated in the capacitor 3 is sufficient to restart the engine E. If the capacitor remaining-capacity determining flag F_FCMGCAP has been set at "1" at Step S17, it is determined that the remaining capacity of the capacitor 3 is sufficient to restart the engine E, and the processing is advanced to Step S18, at which the idle engine stop control performing flag F_FCMG is set at "1". As a result, by prohibiting the restarting of the fuel supply subsequent to the fuel cut by the fuel supply control means 6 on the basis of the command from the engine output control means M2, the engine E is stopped, when the number Ne of revolutions of the engine is decreased to the number of idling-revolutions of the engine. On the other hand, if the capacitor remaining-capacity determining flag F_FCMGCAP has been set at "0" at Step S17, it is determined that the remaining capacity of the capacitor 3 is not sufficient to restart the engine E, and at Step S13, the idle engine stop control performing flag F_FCMG is set at "0". As a result, by restarting, as usual, the fuel supply subsequent to the fuel cut by the fuel supply control means 6, the idling operation is permitted, when the number Ne of revolutions of the engine is decreased to the number of idling-revolutions of the engine.

When the shift position is the neutral position or the parking position, or when the brake pedal 8 has been depressed even if the shift position is the forward travel position, as described above, the engine E is stopped without being idled. Therefore, unnecessary idling of the engine E can be minimized to reduce the amount of fuel consumed to the maximum. However, when the shift position is the backward travel position, when the vehicle speed V is less than 15 km/hr, and when the remaining capacity of the capacitor 3 is not sufficient to restart the engine E, the carrying-out of the idle engine stop control operation is prohibited.

Figure 10:
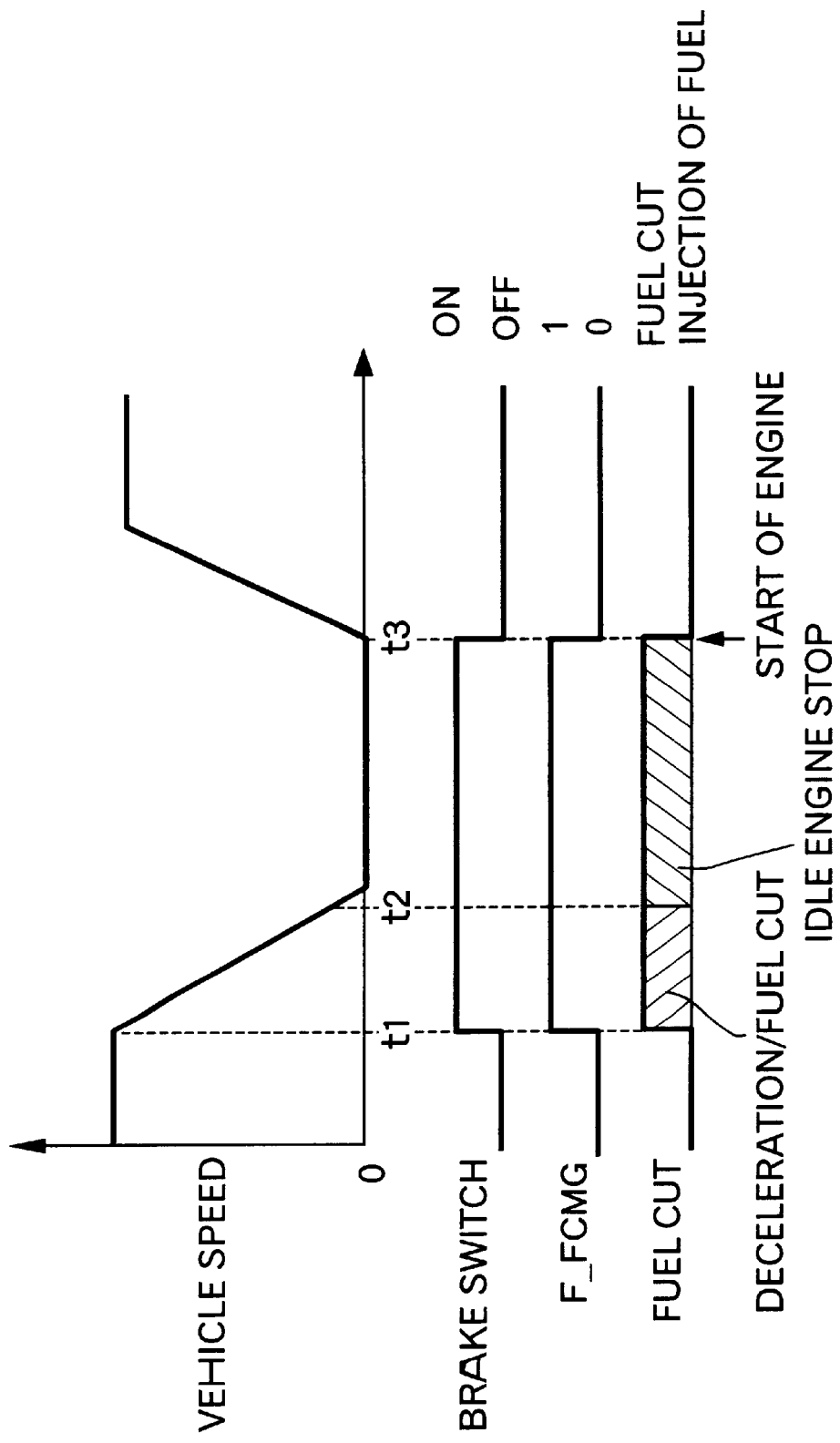

FIG. 10 is a time chart illustrating one example of the idle engine stop control.

When the driver depresses the brake pedal to turn on the brake switch $S_4$ at a time point $t_1$ during cruising of the vehicle, the idle engine stop control performing flag F_FCMG is set at "1" and at the same time, the fuel cut is carried out by the fuel supply control means 6, whereby the vehicle speed V is gradually reduced. Even if the number Ne of revolutions of the engine is decreased to the number of idling-revolutions of the engine at a time point $t_2$, the fuel supply control means 6 does not restart the fuel supply, because the idle engine stop control performing flag F_FCMG has been set at "1". As a result, the engine E is stopped without being idled. When the driver releases his foot from the brake pedal 8 to turn the brake switch $S_4$ off at a time point $t_3$, the idle engine stop control performing flag F_FCMG is set at "0" and at the same time, the fuel cut by the fuel supply control means 6 is finished, and the fuel supplying is restarted. This causes the engine E to be started, thereby enabling the vehicle to travel again.

Figure 9:
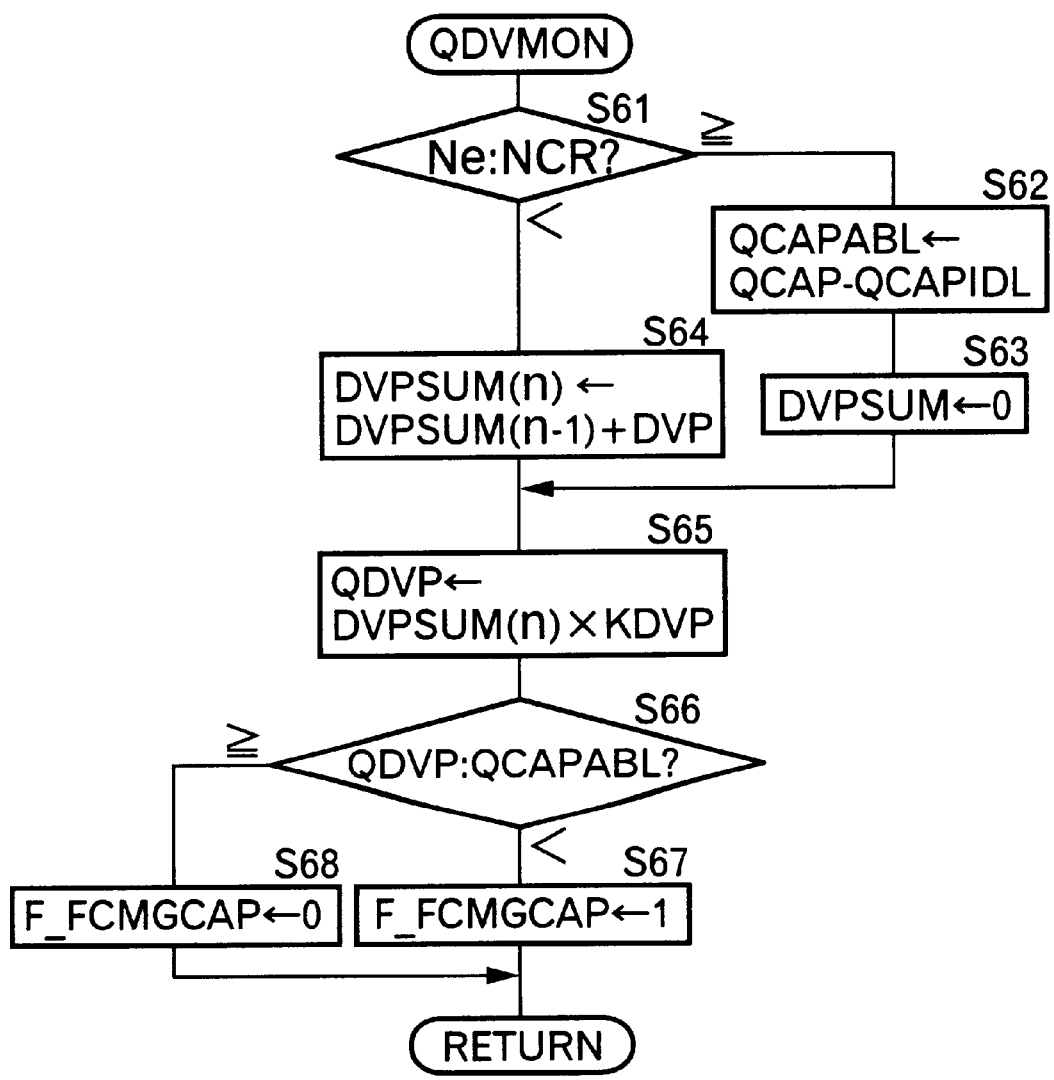

The setting of the capacitor remaining-capacity determining flag F_FCMGCAP (see Step S17 in the flow chart in FIG. 7) will be described below with reference to FIG. 9.

First, at Step S61, the number of revolutions of the engine detected by the engine revolution-number sensor $S_2$ is compared with the engine stall determining revolution-number NCR. If Ne≧NCR to indicate that the engine E is in the operated state, a margin QCAPABL of remaining capacity of the capacitor 3 is calculated at Step S62 by subtracting the capacity QCAPIDL of the capacitor 3 required to start the engine E from the remaining capacity QCAP detected by the capacitor remaining-capacity sensor S7. Then, the 12-volt consumed power integration value DVPSUM is set at "0" at Step S63.

On the other hand, if the engine E is in the stopped state at Step S61, a current value DVPSUM of the 12-volt consumed power integration value DVPSUM(n) is calculated by adding an instantaneous 12-volt power consumed-quantity value DVP (namely, an instantaneous value of power taken out of the auxiliary battery 4) detected by the 12-volt consumed power sensor $S_8$ to a last value of the 12-volt consumed power integration value DVPSUM(n−1). At Step S65, a result QDVP of conversion of the 12-volt consumed power integration value is calculated by multiplying the 12-volt consumed power integration value DVPSUM(n) calculated at Step S64 by a unit conversion factor KDVP.

At subsequent Step S66, the margin QCAPABL of the remaining capacity of the capacitor 3 calculated at Step S62 is compared with the result QDVP of conversion of the 12-volt consumed power integration value calculated at Step S65. When the engine E is stopped, the charging of the capacitor 3 is not carried out, and the 12-volt consumed power (namely, the result QDVP of conversion of the 12-volt consumed power integration value) is taken out of capacitor 3. Therefore, the remaining capacity QCAP of the capacitor 3 is gradually decreased.

If the result QDVP of conversion of the 12-volt consumed power integration value is less than the margin QCAPABL of the remaining capacity of the capacitor 3 at Step S66, i.e., if the remaining capacity QCAP of the capacitor 3 exceeds the capacity of the capacitor 3 required to start the engine E, it is determined that the engine E can be started by the power of the capacitor 3, and at Step S67, the capacitor remaining-capacity determining flag F_FCMGCAP is set at "1" to permit the carrying-out of the idle engine stop control operation. On the other hand, if the result QDVP of conversion of the 12-volt consumed power integration value is equal to or greater than the margin QCAPABL of the remaining capacity of the capacitor 3 at Step S66, i.e., if the remaining capacity QCAP of the capacitor 3 is equal to or less than the capacity of the capacitor 3 required to start the engine E, it is determined that there is a possibility that the engine E cannot be started, and at Step S68, the capacitor remaining-capacity determining flag F FCMGCAP is set at "0" to prohibit the carrying-out of the idle engine stop control operation.

In this manner, the permission and prohibition of the carrying-out of the idle engine stop control operation are determined, while monitoring the remaining capacity QCAP of the capacitor 3 driving the starter motor 7. Therefore, the idle engine stop control operation can be carried out to the maximum to reduce the amount of fuel consumed, while reliably avoiding that the remaining capacity QCAP of the capacitor 3 becomes insufficient, whereby it is impossible to start the engine.

A second embodiment of the present invention will now be described with reference to FIGS. 11 to 15.

Figure 11:
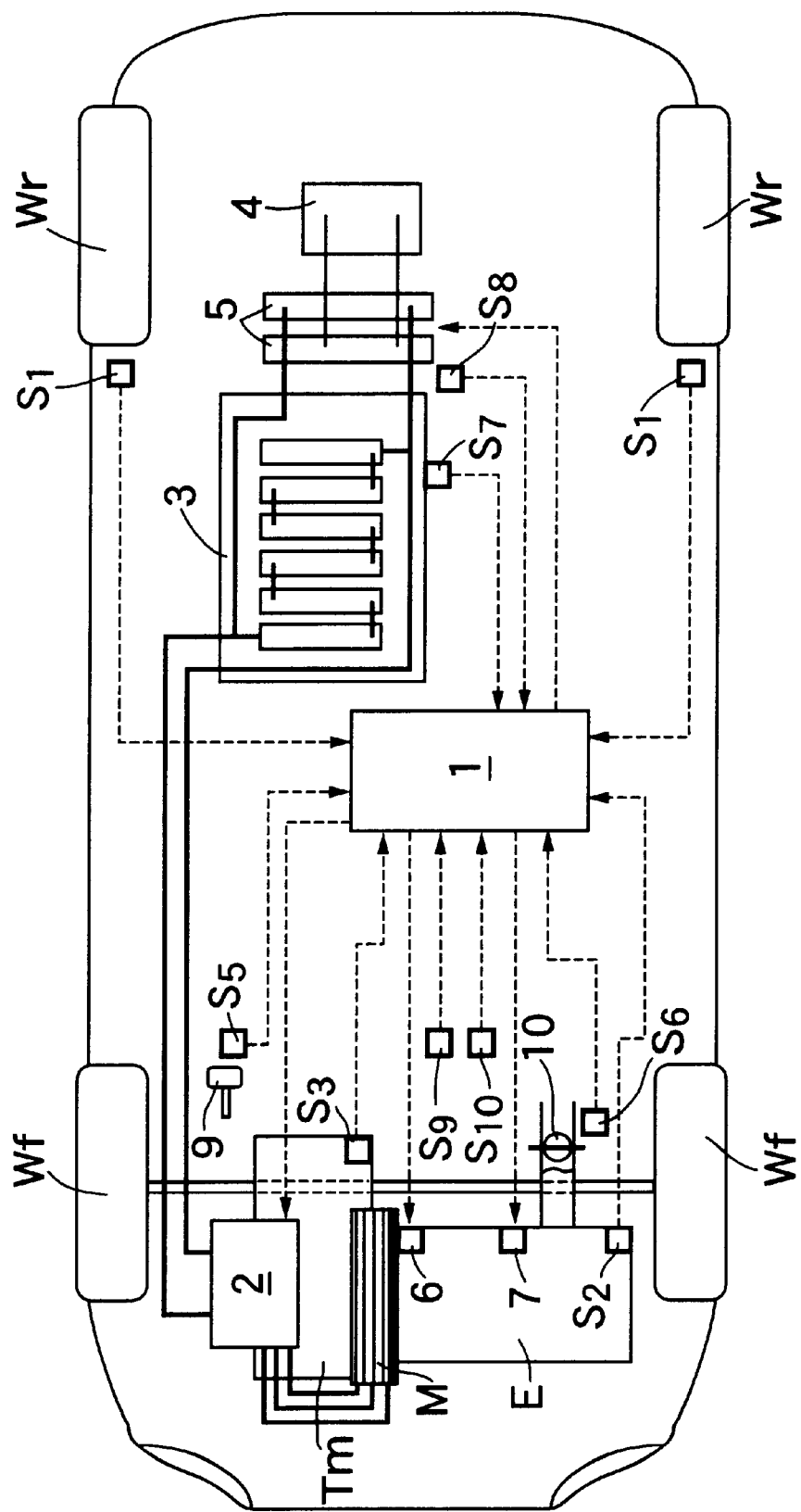

The hybrid vehicle according to the first embodiment shown in FIG. 1 includes the automatic transmission Ta, whereas a hybrid vehicle according to the second embodiment shown in FIG. 11 includes a manual transmission Tm. The following signals are inputted to an electronic control unit 1 in the hybrid vehicle according to the second embodiment: a signal from a vehicle speed sensor $S_1$ for detecting a vehicle speed; a signal from an engine revolution-number sensor $S_2$ for detecting a number Ne of revolutions of the engine; a signal from a shift position sensor $S_3$ for detecting a shift position; a signal from a clutch switch $S_5$ for detecting the operation of a clutch pedal 9; a signal from a throttle opening degree sensor $S_6$ for detecting an degree of opening of a throttle valve 10; a signal from a capacitor remaining-capacity sensor $S_7$ for detecting a remaining capacity of the capacitor 3; a signal from a 12-volt consumed power sensor $S_8$ for detecting a consumed power brought out of the auxiliary battery 4; a signal from an ignition switch $S_9$; and a signal from a starter switch $S_{10}$. Arrangements other than the above-described arrangement are the same as in the first embodiment.

Figure 12:
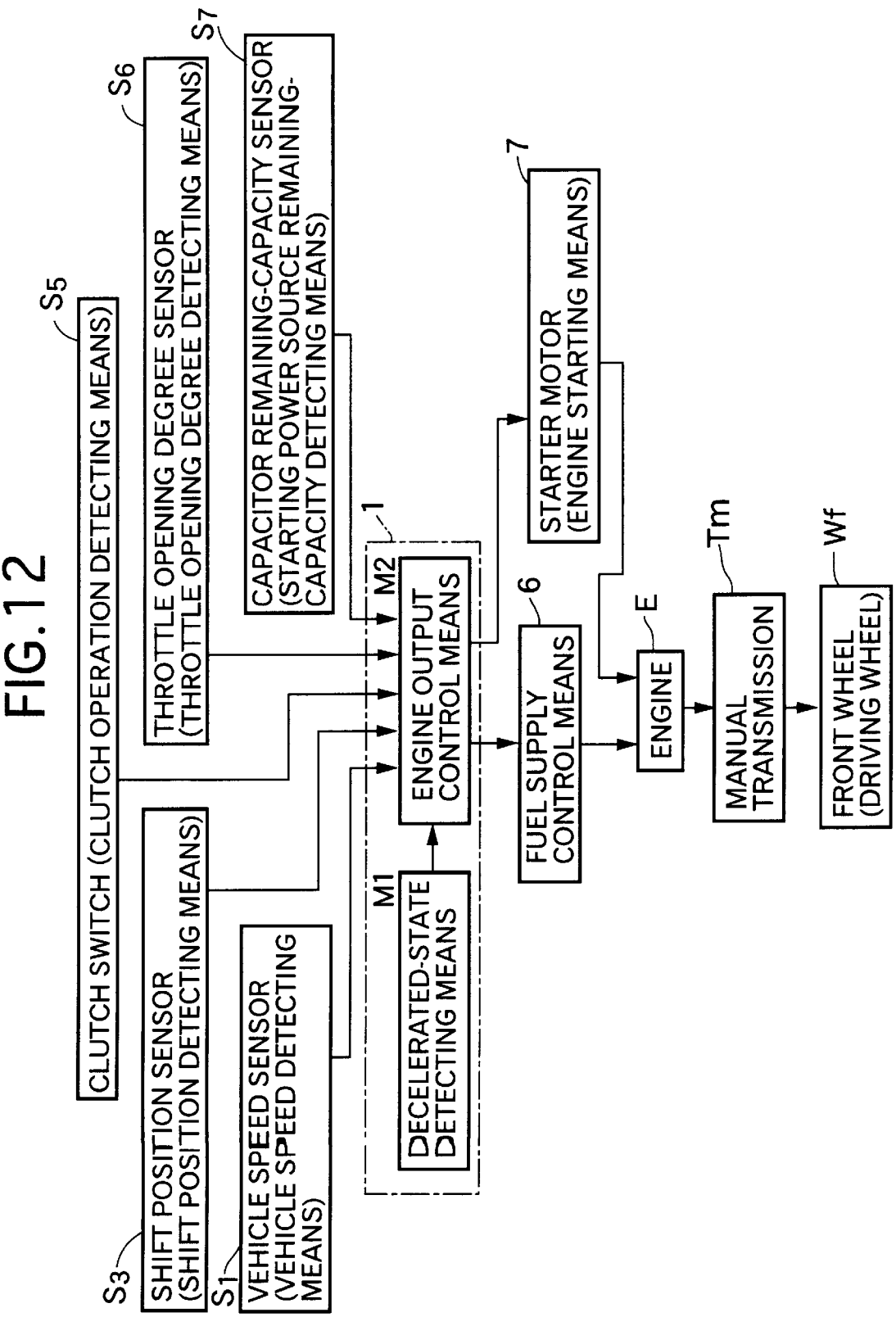
Figure 13:
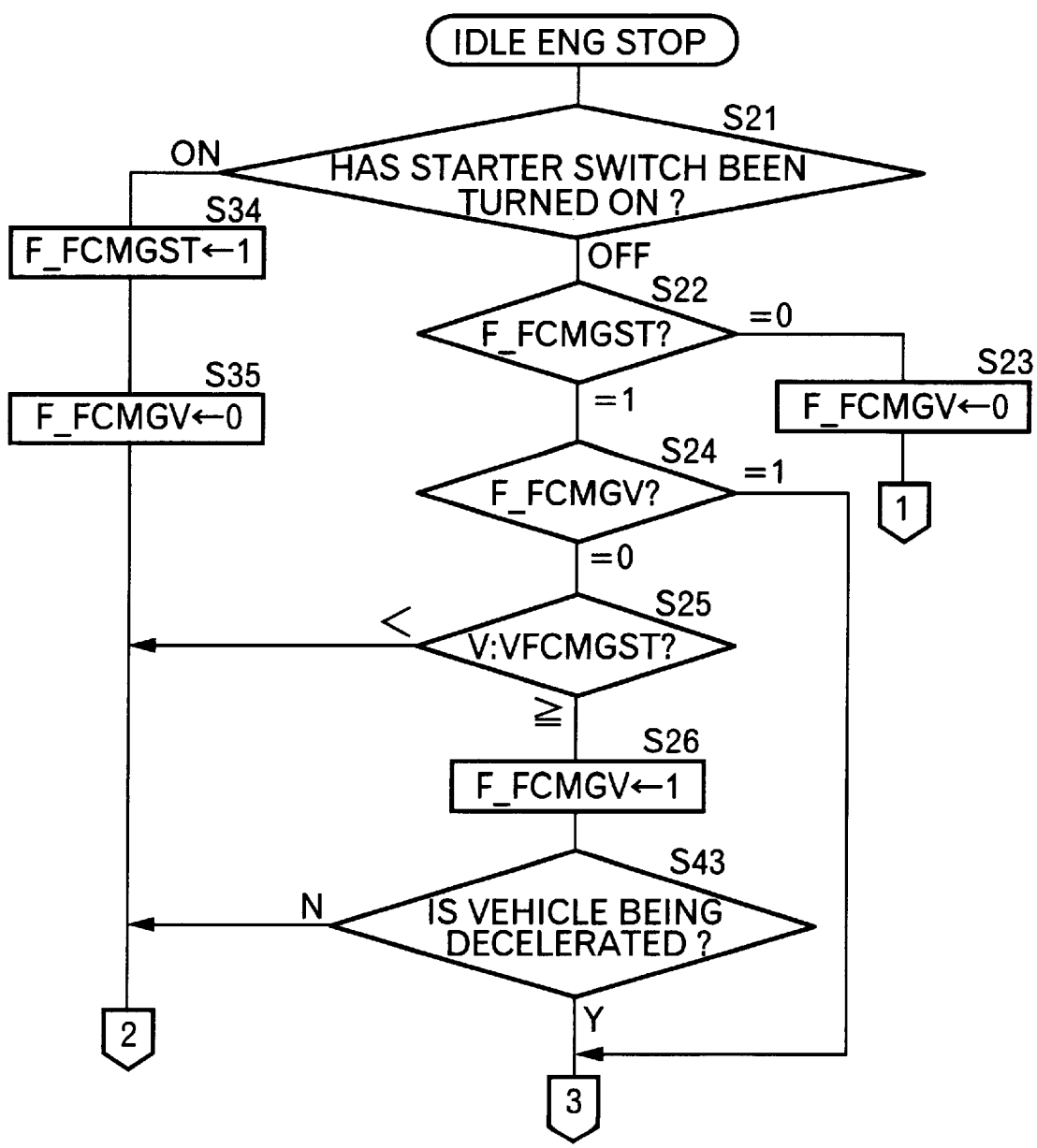
Figure 14:
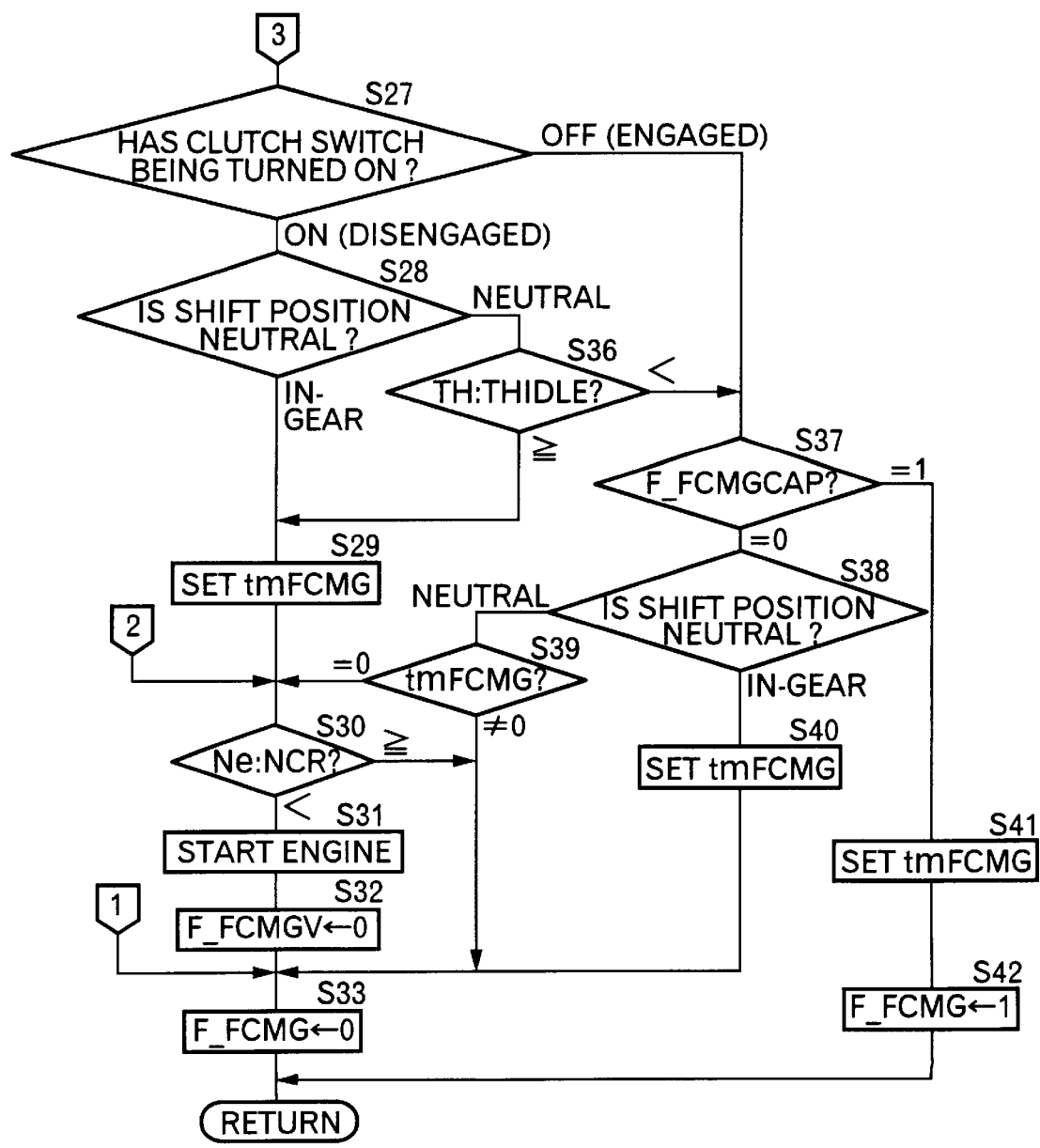

The arrangement of an idle engine stop control system according to this embodiment will be described below with reference to FIG. 12 which.

The fuel supply control means 6 controls the supply of fuel to the engine E driving the front wheels Wf, Wf through the manual transmission Tm on the basis of a command from the electronic control unit 1. The electronic control unit 1 determines whether the idling operation of the engine E is permitted, or prohibited for stopping of the engine E, based on a shift position inputted from the shift position sensor $S_3$, a clutch-disengaged state inputted from the clutch switch $S_5$, a vehicle speed inputted from the vehicle speed sensor $S_1$, a throttle opening degree inputted from the throttle opening degree sensor $S_6$, and a remaining capacity of the capacitor 3 inputted from the capacitor remaining-capacity sensor $S_7$. When the idling operation is to be permitted, the fuel supply control means 6 permits the restarting of the fuel supply from the fuel cut by the command from the electronic control unit 1 to enable the idling operation. When the idling operation is to be prohibited, the fuel supply control means 6 prohibits the restarting of the fuel supply from the fuel cut to stop the engine.

The particular content of the idle engine stop control operation in the second embodiment will be described below.

First, when the starter switch $S_{10}$ is in a turned-off state at Step S21, i.e., when the engine starting operation is not carried out by a driver, the state of the starter switch OFF→ON determining flag F_FCMGST is determined at Step S22. The initial value of the starter switch OFF→ON determining flag F_FCMGST at a time when the ignition switch is turned on, is "0". Thereafter, when the engine starting operation is carried out by the driver to turn on the starter switch $S_{10}$ at Step S21, the starter switch OFF→ON determining flag F_FCMGST is set at "1" at Step S34, and maintained at "1", until the ignition switch is turned off.

Therefore, the answer at Step S22 is "0" for a period from a time point when the driver turns on the ignition switch to a time point when the driver turns on the starter switch $S_{10}$, and the processing is advanced via Step S23 to Step S33 and hence, the starting of the engine at Step S31 which will be described hereinafter cannot be carried out. Namely, in this vehicle, the stopping of the engine during the idling operation and the subsequent starting of the engine are carried out irrespective of the operation of starter switch $S_{10}$ by the driver, as described hereinafter. However, unless the driver intends to turn on the starter switch S10 to move the vehicle, the engine E cannot be started automatically. Thus, the wasteful starting of the engine can be avoided to reduce the amount of fuel consumed.

If the driver turns on the starter switch $S_{10}$ at Step S21, the starter switch OFF→ON determining flag F_FCMGST is set at "1" at Step S34, and a vehicle speed determining flag F_FCMGV, which will be described hereinafter, is set at "0" at Step S35, shifting to Step S30. At Step S30, the number Ne of revolutions of the engine detected by the engine revolution-number sensor $S_2$ is compared with an engine stall determining revolution-number NCR. If Ne<NCR to indicate that the engine E is in a stopped state, the starter motor 7 is operated automatically to start the engine E. As a result, when the engine E is started to ensure that Ne≧NCR, the starting of the engine at the Step S31 is passed, progressing to Step S33.

Subsequently, the idle engine stop control performing flag F_FCMG is set at "0" at Step S33. The idle engine stop control performing flag F_FCMG serves to determine whether the engine E is to be stopped during idling operation thereof. In a state in which the idle engine stop control performing flag F_FCMG has been set at "0", the restarting of the fuel supply subsequent to the fuel cut is carried out, causing the engine E to be maintained in the idling operation. In a state in which the idle engine stop control performing flag F_FCMG has been set at "1", the restarting of the fuel supply subsequent to the fuel cut is prohibited, causing the engine E to be stopped without being idled. The idle engine stop control performing flag F_FCMG is set at "1" at Step S42, when a predetermined condition which will be described hereinafter has been established.

Now, if the driver turns off the starter switch $S_{10}$ after turning-on of the starter switch $S_{10}$ to start the engine E, the starter switch OFF→ON determining flag F_FCMGST has been already set at "1" at Step S22 and hence, the processing is advanced to Step S24, at which the state of the vehicle speed determining flag F_FCMGV is determined. The vehicle speed determining flag F_FCMGV is set at "0" immediately after starting of the vehicle, and when the vehicle speed V detected by the vehicle speed sensor $S_1$ is equal to or higher than a predetermined vehicle speed (e.g., 15 km/hr) at next Step S25, the vehicle speed determining flag F_FCMGV is set at "1" at Step S26. Therefore, unless the vehicle sped V is equal to or greater than 15 km/hr at Step S25, the processing is necessarily advanced to Step S33, at which the idle engine stop control performing flag F_FCMG is set at "0", whereby the idle engine stop control operation is discontinued. Therefore, the idle engine stop control operation cannot be carried out.

What this means is as follows: Suppose that when the traveling of the vehicle at a lower speed and the stopping of the vehicle are repeated at short time intervals in a traffic jam or the like, the engine is repeatedly stopped and restarted every time a shift lever is operated between the neutral position and the forward travel position in a state in which the clutch pedal 9 has been depressed. In this case, there is a possibility that the smooth traveling cannot be achieved. However, the above problem can be solved by prohibiting the carrying-out of the idle engine stop control operation, when the vehicle speed V is less than 15 km/hr.

If it is detected at subsequent Step S43 by the decelerated-state detecting means M1 that the vehicle is in a decelerated state, the processing is shifted to Step S27. If the clutch pedal 9 is not depressed, whereby the clutch switch $S_5$ is in a turned-off state at Step S27, i.e., if the clutch is in an engaged state, the processing is advanced to Step S37 to carry out the idle engine stop control operation. If the clutch pedal 9 is depressed to turn the clutch switch $S_5$ on (in a clutch-disengaged state) at Step S27, and the shift position detected by the shift position sensor $S_3$ is the neutral position at Step S28, the processing is advanced to Step S36. If the throttle opening degree detected by the throttle opening degree sensor $S_6$ is less than a fully-closed throttle opening degree THIDLE at Step S36, the processing is advanced to Step S37 to carry out the idle engine stop control operation.

On the other hand, even if the clutch switch $S_5$ has been turned on to provide the clutch-disengaged state at Step S27, if the shift position is an in-gear state (the forward travel position or the backward travel position) at Step S28, the idle engine stop control operation is not carried out, progressing to Step S29, at which an engine restarting delay timer tmFCMG which will be described hereinafter is set. If the clutch switch $S_5$ has been turned on to provide the clutch-disengaged state at Step S27, the shift position is the neutral position at Step S28 and further, the throttle opening degree TH is equal to or larger than a fully-opened throttle opening degree THIDLE at Step S36, the idle engine stop control operation is likewise not carried out, progressing to Step S29.

What this means is as follows: The clutch-engaged state in which the clutch switch $S_5$ has been turned off, is a signal-waiting state or the like, if the vehicle is in stoppage. Therefore, the frequency of stoppage of the engine E can be increased to the maximum to provide a reduction in amount of fuel consumed. If the shift position is the neutral position even in the clutch-disengaged state in which the clutch switch $S_5$ has been turned on, it is likewise determined that the driver does not have an intention to move the vehicle. Therefore, the engine E can be likewise stopped to provide a reduction in the amount of fuel consumed.

However, if the throttle opening degree TH is equal to or greater than the fully-closed throttle opening degree THIDLE at Step S36, i.e., if the driver has depressed an accelerator pedal, the idle engine stop control operation is not carried out. This is because when the downshifting is to be conducted in the vehicle including the manual transmission Tm, the accelerator pedal may occasionally be temporarily depressed to increase the number Ne of revolutions of the engine in order to smoothly conduct the engagement of the clutch. In such a case, if the number Ne of revolutions of the engine E is not increased even if the accelerator pedal has been depressed, because the idle engine stop control operation is being carried out, there is a possibility that the downshifting operation is not carried out smoothly. In this embodiment, however, when the accelerator pedal is depressed, the idle engine stop control operation is discontinued and hence, the number Ne of revolutions of the engine can be increased by depressing the accelerator pedal to carry out the downshifting operation smoothly.

Suppose that the vehicle in the stopped state is to be started in a state in which the idle engine stop control operation is being carried out. In this case, when the clutch pedal 9 is depressed and the shift level is brought into the in-gear, the engine is started automatically, but if the accelerator pedal is depressed prior to such operation, the engine E can be started. Therefore, the engine E can be started before shifting into gear, thereby carrying out the starting of the vehicle smoothly.

When the clutch switch 9 has been turned off at Step S27, or when the throttle opening degree TH is less than the fully-closed throttle opening degree THIDLE at Step S36, the state of the capacitor remaining-capacity determining flag F_FCMGCAP is determined at Step S37, before the idle engine stop control operation is carried out.

The capacitor remaining-capacity determining flag F_FCMGCAP is intended to determine whether the remaining capacity of the power accumulated in the capacitor 3 is sufficient to restart the stopped engine E. If the capacitor remaining-capacity determining flag F_FCMGCAP has been set at "1" at Step S37, it is determined that the remaining capacity of the capacitor 3 is sufficient to restart the engine E. The restarting delay timer tmFCMG which will be described hereinafter is set at Step S41 and then, the idle engine stop control performing flag F_FCMG is set at "1" at Step S42. The setting of the capacitor remaining-capacity determining flag F FCMGCAP is the same as the case described with reference to FIG. 9 showing the first embodiment and hence, the duplicated description is omitted.

As a result, the engine E is stopped when the number Ne of revolutions of the engine is decreased to the number of idling-revolutions of the engine by prohibiting the restarting of the fuel supply subsequent to the fuel cut by the fuel supply control means 6. On the other hand, if the capacitor remaining-capacity determining flag F_FCMGCAP has been set at "0" at Step S37, it is determined that the remaining capacity is not sufficient to restart the engine E, and at Step S33, the idle engine stop control performing flag F_FCMG is set at "0". As a result, the idling operation is permitted when the number Ne of revolutions of the engine is decreased to the number of idling-revolutions of the engine by restarting, as usual, the fuel supply subsequent to the fuel cut by the fuel supply control means 6.

As described above, when the clutch switch $S_5$ is in the turned-off state (the clutch-engaged state), and when the clutch switch $S_5$ is in the turned-on state (the clutch-disengaged state) and the shift position is the neutral position, the engine is stopped without being idled. Therefore, the unnecessary idling operation of the engine E can be minimized to reduce the amount of fuel consumed to the maximum. However, as described above, when the vehicle speed V is less than 15 km/hr, when the accelerator pedal has been depressed, and when the remaining capacity of the capacitor 3 is not sufficient to restart the engine E, the carrying-out of the idle engine stop control operation is prohibited.

If the remaining capacity of the capacitor 3 is not sufficient to restart the engine E at Step S37 and at that time, the engine E is in the stopped state at Step S30, the starter motor 7 is driven at Step S31, whereby the engine E is restarted before being fallen into a state in which it cannot be actually restarted. However, if the clutch is in the engaged state and the shift position is in the in-gear state, when the engine E is restarted, a problem of a large load applied to the starter motor 7 is encountered.

Therefore, it is determined at Step S38 whether the shift position is the neutral position or in the in-gear state. If the shift position is in the in-gear state, the engine restarting delay timer tmFCMG is set at Step S40, shifting to Step S33. Thus, it is possible to avoid the restarting of the engine E in the in-gear state at Step S31 and to prevent a large load from being applied to the starter motor 7. Only when the neutral state is continued until a predetermined time (e.g., 2 seconds) countered by the engine restarting delay timer tmFCMG is lapsed, the restarting of the engine E at Step S31 is permitted even if the shift position is the neutral position at Step S39. Thus, only when the shift position is reliably neutral, the restarting of the engine E can be carried out, and it is possible to prevent an over-load from being applied to the starter motor 7.

FIG. 15 shows a time chart illustrating one example of the idle engine stop control operation.

When the driver releases his foot from the accelerator pedal and depresses the brake pedal at a time point $t_1$ during cruising of the vehicle, the fuel cut is carried out by the fuel supply control means 6, whereby the vehicle speed V is gradually reduced. If the driver depresses the clutch pedal 9 to bring the shift position to the neutral position when the number Ne of revolutions of the engine is near the number of idling-revolutions of the engine at time point $t_2$, the engine E is stopped without being idled, because the idle engine stop control performing flag F_FCMG has been already set at "1", whereby the fuel supply subsequent to the fuel cut is not restarted. Thereafter, when the driver depresses the clutch pedal 9 to bring the shift position to the in-gear state at a time point $t_3$ in order to start the vehicle, the idle engine stop control performing flag F_FCMG is set at "0" and at the same time, the fuel cut by the fuel supply control means 6 is finished, and the supplying of fuel is restarted to start the engine E. When the clutch is brought into the engaged state at time point $t_4$, the vehicle can be started.

Although the embodiments of the present invention have been described in detail, it will be understood that the present invention is not limited to the above-described embodiments, and various modifications in design may be made without departing from the spirit and scope of the invention defined in claims.

For example, the hybrid vehicle using the engine E and the motor M as traveling drive sources has been illustrated in the embodiments, but the present invention is applicable to vehicles using only an engine E as a traveling drive source.

The automatic transmission Ta in the first embodiment is not limited to a continuous invariable type and may be of a continuous variable type (CVT).

The engine E is stopped without restoring of the fuel supply subsequent to the fuel cut in the embodiment, but a target number of revolutions of the engine can be set at a number of revolutions less than the number of idling-revolutions to stop the engine E. An ignition control can be also employed in addition to the control of the amount of fuel supplied.

The motor for traveling of the vehicle can be utilized as a starter motor without provision of a special starter motor 7 for starting the engine E. Further, the engine starting means in the present invention is not limited to the starter motor 7 or the motor M, and includes a so-called "intrusion" type for starting the engine using a kinetic energy of the traveling vehicle. What corresponds to this is, for example, a case where the engine E is restarted at Step S12 in the flow chart in FIG. 8, when the vehicle speed V is less than 15 km/hr at Step S7 in the flow chart in FIG. 7.

The engine starting power source is not limited to the capacitor 3, and may be a rechargeable battery. In this case, a remaining capacity can be calculated by integrating the charged current and the discharged current in the battery.

In the cruising/idling mode, the capacitor 3 can be charged by the electric power generated by the motor M.

What is claimed is:

1. An engine stop control system for a vehicle, comprising:

an engine;

an automatic transmission for transmitting a driving force of said engine to driven wheels;

a shift position detecting means for detecting a shift position of said automatic transmission;

a braking operation detecting means for detecting a braking operation provided by a drive;

a fuel supply control means for controlling the supply of fuel to said engine;

a decelerated-state detecting means for detecting a decelerated state of the vehicle; and an engine output control means including a means for cutting off the supplying of fuel to said engine by said fuel supply control means when the decelerated state of the vehicle is detected by said decelerated-state detecting means, and for restarting the supplying of fuel to start said engine when the number of revolution is of the engine is equal to or less than a threshold value, said engine output control means operating after cutting-off of the supply of fuel by said fuel supply control means during deceleration of the vehicle, to restart the supplying of fuel if the number of revolutions of the engine becomes equal to or less than said threshold value when the shift position detected by said shift position detecting means is a travel position and the braking operation is not detected by said braking operation detecting means, and to stop said engine without restarting of the supply of fuel even if the number of revolutions of the engine becomes equal to or less than said threshold value, when the shift position detected by said shift position detecting means is a non-travel position, or when the shift position detected by said shift position detecting means is a travel position and the braking operation is detected by said braking operation detecting means.

2. An engine stop control system for a vehicle according to claim 1, wherein, after stopping of the engine, when the shift position detected by said shift position detecting means is a travel position and the braking operation is detected by said braking operation detecting means, said engine is maintained in a stopped state, and when the shift position detected by said shift position detecting means is a travel position and the braking operation is not detected by said braking operation detecting means, the engine is started.

3. An engine stop control system for a vehicle according to claim 1, wherein when the shift position detected by said shift position detecting means is a backward travel position after stopping of the engine, said engine is started.

4. An engine stop control system for a vehicle according to claim 3, wherein when the shift position detected by said shift position detecting means is said backward travel position for a period of time exceeding a predetermined time, said engine is started.

5. An engine stop control system for a vehicle according to any of claims 1 to 4, wherein when a remaining capacity of an engine starting power source is equal to or greater than a predetermined value, said engine is permitted to stop and when the remaining capacity of said engine starting power source is less than the predetermined value, the stopping of said engine is prohibited, or the starting of said engine is permitted.

6. An engine stop control system for a vehicle according to claim 1, wherein the cutting-off of the supply of fuel to said engine is carried out after a vehicle speed once reaches a predetermined vehicle speed.

7. An engine stop control system for a vehicle according to claim 2, wherein the cutting-off of the supply of fuel to said engine is carried out after a vehicle speed once reaches a predetermined vehicle speed.

8. An engine stop control system for a vehicle according to claim 3, wherein the cutting-off of the supply of fuel to said engine is carried out after a vehicle speed once reaches a predetermined vehicle speed.

9. An engine stop control system for a vehicle according to claim 4, wherein the cutting-off of the supply of fuel to said engine is carried out after a vehicle speed once reaches a predetermined vehicle speed.

* * * * *